(12) United States Patent
Rau et al.

(10) Patent No.: US 8,344,580 B2
(45) Date of Patent: Jan. 1, 2013

(54) STATOR FOR A POLYPHASE ELECTRIC MACHINE AND METHOD FOR MANUFACTURING SAME

(75) Inventors: Eberhard Rau, Korntal-Muenchingen (DE); Alexander Shendi, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 12/295,560

(22) PCT Filed: Mar. 30, 2007

(86) PCT No.: PCT/EP2007/053110
§ 371 (c)(1),
(2), (4) Date: Aug. 12, 2010

(87) PCT Pub. No.: WO2007/113253
PCT Pub. Date: Oct. 11, 2007

(65) Prior Publication Data
US 2010/0295390 A1 Nov. 25, 2010

(30) Foreign Application Priority Data
Mar. 31, 2006 (DE) .................. 10 2006 016 249

(51) Int. Cl.
*H02K 1/06* (2006.01)
(52) U.S. Cl. ................... 310/216.069; 310/216.074
(58) Field of Classification Search ........... 310/216.097, 310/216.111, 214–215
See application file for complete search history.

(56) References Cited

U.S. PATENT DOCUMENTS
3,886,256 A * 5/1975 Ohuchi et al. ......... 310/216.069
4,616,407 A   10/1986 Tamaki et al.
(Continued)

FOREIGN PATENT DOCUMENTS
CN   1579043   2/2005
(Continued)

OTHER PUBLICATIONS
International Search Report, PCT/EP2007/053110, dated Jul. 31, 2007.

*Primary Examiner* — Thanh Lam
(74) *Attorney, Agent, or Firm* — Kenyon & Kenyon LLP (57) ABSTRACT

A stator (16) is proposed for a polyphase electric machine, having a core body (17), which is provided with slots (114), which are situated in the radial direction with respect to an axis of rotation of the electric machine on one side of the core body (17) parallel to the longitudinal axis of the core body (17), having a slot width ($bn1$, $bn2$) and a stator yoke (122) being provided on the opposite side, with two slots (114) each being separated from one another by a tooth (116) having a tooth width ($bz1$, $bz2$) and extending from a slot base (120) to a tooth head (118), these slots (114) being provided to receive at least one coil winding having a plurality of coils that is electrically connected in series and are manufactured from at least one continuous wire (124) without interruption, the ratio ($bz2/hj$) of the tooth width ($bz2$) to the yoke height ($hj$) at the tooth head (118) being between 0.3 and 0.8 and/or the ratio ($bz2/bn2$) of the tooth width ($bz2$) at the tooth head (118) to the slot width ($bn2$) at the tooth head (118) being between 0.3 and 3, and/or the ratio ($mCu(slot)/mCu(total)$) of the copper mass of the wire (124) in the slot (114) to the total copper mass of the wire (124) being between 0.43 and 0.55.

19 Claims, 5 Drawing Sheets

U.S. PATENT DOCUMENTS

| | | | |
|---|---|---|---|
| 4,747,288 A * | 5/1988 | Fritzsche | 72/130 |
| 4,780,635 A * | 10/1988 | Neumann | 310/216.111 |
| 5,359,249 A * | 10/1994 | Tanaka | 310/216.069 |
| 5,576,584 A * | 11/1996 | Kusumoto et al. | 310/45 |
| 5,763,978 A * | 6/1998 | Uchida et al. | 310/215 |
| 5,786,651 A * | 7/1998 | Suzuki | 310/216.009 |
| 5,804,896 A | 9/1998 | Takehara et al. | |
| 6,023,119 A | 2/2000 | Asao | |
| 6,445,102 B1 | 9/2002 | Gruendl et al. | |
| 6,504,283 B1 * | 1/2003 | Asao et al. | 310/216.004 |
| 6,713,928 B2 * | 3/2004 | Takizawa et al. | 310/214 |
| 6,984,909 B2 | 1/2006 | Kadoya et al. | |
| 2003/0002357 A1 | 1/2003 | Kwon et al. | |
| 2003/0071534 A1 | 4/2003 | Kreuzer et al. | |
| 2003/0137205 A1 | 7/2003 | Neet | |
| 2004/0070304 A1* | 4/2004 | Enomoto et al. | 310/218 |
| 2005/0108870 A1* | 5/2005 | Harada et al. | 29/606 |
| 2005/0280327 A1* | 12/2005 | Neet | 310/214 |
| 2006/0012260 A1 | 1/2006 | Sadiku et al. | |
| 2006/0038459 A1 | 2/2006 | Adaniya et al. | |

FOREIGN PATENT DOCUMENTS

| | | |
|---|---|---|
| DE | 2436319 | 2/1976 |
| DE | 3303713 | 9/1983 |
| DE | 3346031 | 6/1984 |
| DE | 37 04 226 | 8/1987 |
| DE | 197 36 645 | 2/1999 |
| DE | 103 02 947 | 8/2003 |
| DE | 10321956 | 3/2004 |
| DE | 10243986 | 4/2004 |
| DE | 103 06 147 | 8/2004 |
| DE | 10361670 | 8/2005 |
| DE | 102004034526 | 2/2006 |
| DE | 102005039190 | 3/2006 |
| EP | 1 146 624 | 10/2001 |
| EP | 1 223 657 | 7/2002 |
| EP | 1 239 568 | 9/2002 |
| EP | 1 372 242 | 12/2003 |
| EP | 1 517 427 | 3/2005 |
| EP | 1 521 346 | 4/2005 |
| FR | 2 376 544 | 7/1978 |
| FR | 2 864 716 | 7/2005 |
| JP | 57-6373 | 6/1955 |
| JP | 10-80077 | 3/1998 |
| JP | 10-511837 | 11/1998 |
| JP | 2000-102215 | 4/2000 |
| JP | 2000-350390 | 12/2000 |
| JP | 2001-268837 | 9/2001 |
| WO | WO 96/15574 | 5/1996 |
| WO | WO 01/54254 | 7/2001 |
| WO | WO 2004/030179 | 4/2004 |
| WO | WO 2004/062065 | 7/2004 |
| WO | WO 2005/054766 | 7/2005 |

* cited by examiner

STATOR FOR A POLYPHASE ELECTRIC MACHINE AND METHOD FOR MANUFACTURING SAME

BACKGROUND INFORMATION

The present invention relates to a polyphase electric machine, in particular a polyphase generator for motor vehicles, having a stator according to the definition of the species of Claim 1 and a method for manufacturing a stator as recited in Claim 17.

Various methods and configurations for achieving a high slot filling factor in generators have already been proposed, in which more than 60% of the slot is filled with copper wire, e.g., in DE 103 029 47 A1, DE 103 061 47 A1 or EP1372242A2. U-shaped connector pieces may be inserted axially from one end through the stator slots, bent on the opposite side, and then welded together. This method is very complex and expensive due to the large number of spot welds. Coils may also be inserted into the open slots of a flat metal laminate and then the laminated core together with the coils may be bent into a round shape. This method is also complex and also entails tolerance problems.

An attempt is made with the present invention to eliminate or at least greatly reduce the aforementioned disadvantages through a suitable design of the stator.

SUMMARY OF THE INVENTION

It is assumed that windings are inserted into the slots of a round laminated core with the aid of a winding mandrel, a winding being held by a mandrel, and then inserted radially into the open slots of the laminated core, the wire width corresponding essentially to the slot width minus the slot insulation.

The stator according to the present invention has a ratio of tooth width at the head of the tooth to yoke height between 0.3 and 0.8 and/or a ratio of tooth width at the head of the tooth to slot width at the head of the tooth between 0.3 and 3 and/or a ratio of copper mass of the wire in the slot to the total copper mass of the wire being between 0.43 and 0.55, the slot width being essentially equal to the slot width at the tooth head. The total copper mass includes the terminal wiring. Therefore, alternatively or in combination, an optimized design of tooth width to yoke height, of tooth width to slot width and/or of the cooling effect of the stator is achieved. It is advantageous if the laminated core of the stator does not have pronounced tooth heads, each winding has continuous wires, and the slot width corresponds approximately to the wire width. Expediently in the design of the stator, the slot is designed to have parallel sides. At smaller values of the aforementioned tooth width to yoke height of less than 0.3 and/or the aforementioned tooth width to slot width of less than 0.3, when a current is applied to it, the core circuit of the stator is so weak that it reaches saturation before the maximum power of the polyphase electric machine is deliverable. At values of more than 0.8 (tooth width to yoke height) and/or more than 3 (tooth width to slot width) the core circuit is dimensioned well but the winding resistance increases due to smaller and smaller slot areas. From the ranges according to the present invention, preferred slot numbers between 60 and 120 are obtained in the stator. If fewer slots are provided, the wire diameter increases due to the increasing slot area and results in a marked skin effect in the wire. The aforementioned ratio of copper masses according to the present invention allows advantageous cooling of the stator, even if the slot area is reduced in comparison with trapezoidal slots due to the parallel sides of the slots and therefore less copper may be introduced into the slot. The total mass of the copper in the stator is composed of the mass of the copper in the slots forming the electromagnetically active part and the mass of the copper in the winding heads, which provides cooling but at the same time is also responsible for the winding resistance and thus for the copper losses. Adequate cooling may be achieved despite the reduced copper mass. For generators having a smaller iron length in the rotor, the optimum mass ratio is shifted toward higher values; for generators having a greater iron length, the optimum is shifted toward lower values.

A particularly favorable range for the ratio of tooth width at the tooth head to yoke height is between 0.4 and 0.6, preferably between 0.4 and 0.5.

A particularly favorable range for the ratio of tooth width at the tooth head to slot width at the tooth head is between 0.5 and 2.5, preferably between 0.7 and 1.6.

A particularly favorable range for the ratio of copper mass of the wire in the slots to the total copper mass of the wire in the stator is between 0.45 and 0.53, preferably between 0.47 and 0.51.

The slots in the area of the tooth head and in the area of the slot base preferably have a comparable approximately equal width.

In a favorable embodiment, a good attachment of the windings is achievable despite the lack of a pronounced tooth head, if their wires have a winding head which protrudes axially beyond the slots and if the winding head is impregnated in such a way that the impregnation of a wire of one phase in the winding head has at least one point of contact with all other phases due to the impregnation, this contact point being reinforced by impregnation.

The method according to the present invention for manufacturing a stator for a polyphase electric machine provides that the core body is formed from a laminated core which is shaped from a strip having slots and teeth, in such a way that the strips are situated in parallel and intermeshed and are cut in pairs out of sheet metal. There is very little waste in cutting, thus allowing inexpensive production.

Of such strips and/or strip-shaped lamellae, a flat core body may also be formed from one of the toothed parallel strips by cutting it to a predetermined length and stacking and/or bundling the strip lamellae thereby produced one on top of the other. In a subsequent method step, the flat laminated core may be bent to form a round stator.

Alternatively, a round, i.e., hollow cylindrical core body may also be wound from a toothed parallel strip in a helical pattern and the winding may then be inserted into the round laminated core. Then with each revolution of the strip about the axis of the cylinder, one layer of the laminated core is formed on the preceding layer.

In a favorable method step, the wires are secured in the slots by impregnation of their winding heads.

In a favorable method step, the round wires of the winding are impressed onto the slot shape of the round stator and are then introduced into the stator.

BRIEF DESCRIPTION OF THE DRAWINGS

Additional embodiments, aspects, and advantages of the present invention are also derived independently of how they are combined in the claims without restriction of generality, from exemplary embodiments of the present invention described below on the basis of the drawings.

DETAILED DESCRIPTION OF THE EXEMPLARY EMBODIMENTS

Figure 5:
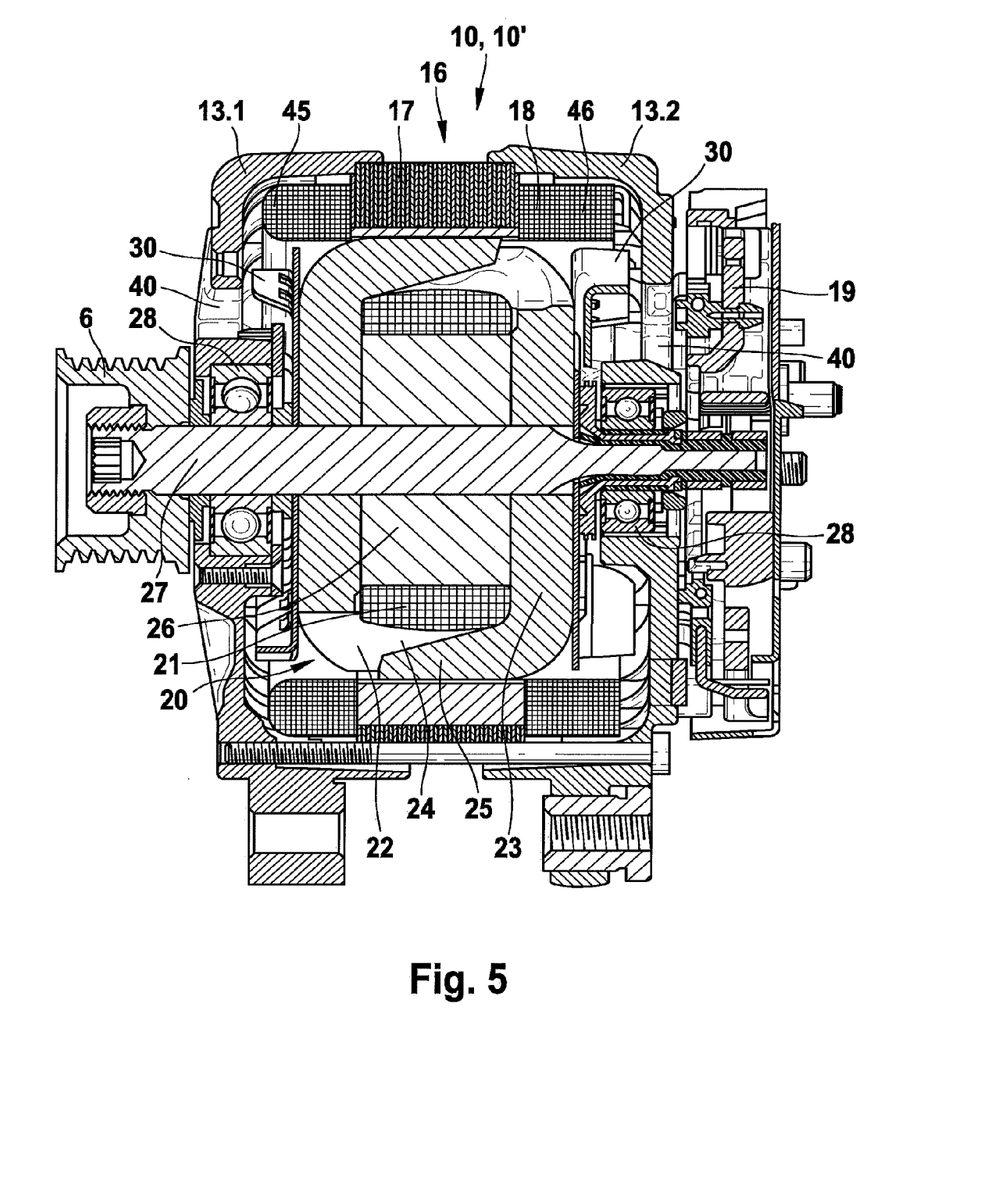
FIG. 5 shows a sectional diagram of a polyphase electric machine designed as a claw pole generator.

FIG. 5 shows a polyphase electric machine 10 designed as a generator such as that used in motor vehicles, for example. Electric machine 10 has a stator 16 having a core body 17 and a winding system 18. Stator 16 is carried by two bearing shields, a drive bearing shield 13.1 facing a pulley 6 and a slip ring beating shield 13.2. Stator 16 radially encompasses a rotor 20 mounted on a shaft 27 and designed as a claw pole rotor. Rotor 20 has two claw pole boards 22, 23, claw fingers 24, 25 designed essentially in a trapezoidal shape extending axially on the outside circumference thereof. Shaft 27 carries the two oppositely polarized claw pole boards, which are situated in the rotor in such a way that their claw fingers extending axially are intermeshed and alternate with one another as north and south poles in the circumferential direction. This results in the claw pole interspaces that are required magnetically between the oppositely magnetized claw fingers situated opposite one another in the circumferential direction. The claw finger tips of claw fingers 24, 25 situated opposite one another in the circumferential direction are spaced axially apart from one another. Rotor 20 is designed to be essentially cylindrical, having a pole core 26 which holds the two claw pole boards 22, 23 at a distance and is surrounded by excitation winding 21. The excitation winding has a single ring coil having a pole pair. Claw pole boards 22, 23 of pole core 26, and excitation winding 21 together form the magnetically active part of rotor 20. Shaft 27 is supported in a roller bearing 28 on each end, each bearing being situated in one of two bearing shields 13.1, 13.2. Behind the slip ring bearing shield 13.2—outside of the bearing shield—in this exemplary embodiment there is a 6-pulse bridge circuit (not shown in detail) and an electric field regulator which regulates the electromagnetic excitation of rotor 20 and contacts excitation winding 21, but as an alternative, both the 6-pulse bridge circuit and the field regulator may be located inside slip ring bearing shield 13.2. The 6-pulse bridge circuit is designed as bridge rectifier 19. A fan 30 is connected axially to each of the two end faces of rotor 20. Fans 30 cool electric machine 10, in particular stator 16, via its winding heads 45, 46. To do so, fresh air is drawn in axially through intake openings 40, deflected radially and directed to at least one part of winding heads 45, 46 to thereby cool them. Fans 30 are preferably designed as radial fans, but may also be designed in such a way that either individually or the two together they have at least one axial component.

This yields the following function of electric machine 10, which is designed as a generator: if shaft 27 is driven to rotate by a drive, e.g., the internal combustion engine of a motor vehicle, via pulley 6, then rotor 20 rotates and induces a polyphase alternating current in winding system 18 of stator 16—with current flow through excitation winding 21—this alternating voltage being rectified via bridge rectifier 19 by connecting a winding system 18 of stator 16. Alternatively, winding system 18 may also be connected to or in the vicinity of a winding head. The size of the output voltage is regulated by excitation current regulation at a constant voltage, which is independent of rotational speed and load. The dc current supplies power to the consumers and charges a battery in the vehicle electric system.

Figure 1A:
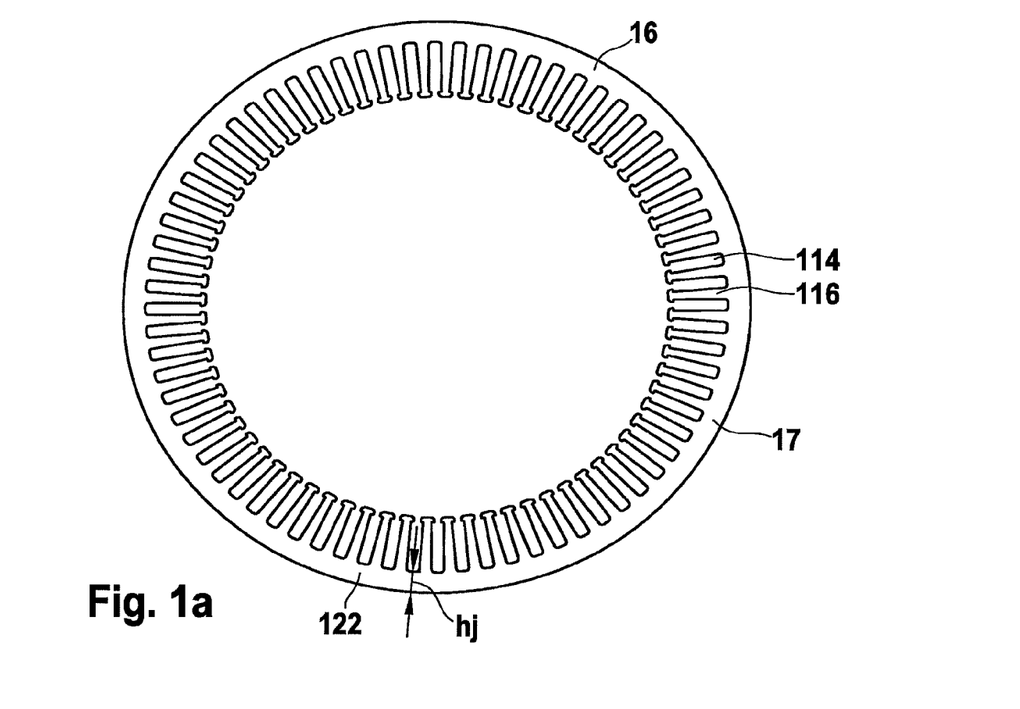
FIG. 1a shows a top view of a preferred stator.
Figure 1B:
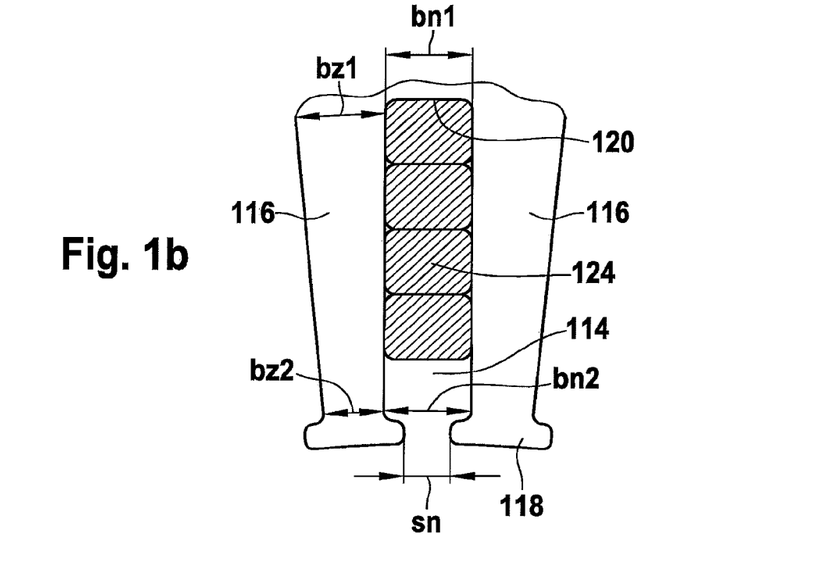
FIG. 1b shows a detail of a top view of a preferred stator.

FIG. 1a shows a top view of a preferred stator 16, which does not include winding system 18 for reasons of simplicity. FIG. 1b shows a detail of preferred stator 16 for a polyphase electric machine as a detail. Stator 16 has a core body 17 which, as seen in the radial direction from an axis of rotation of the electric machine, has slots 114 on one side parallel to the longitudinal axis of core body 17, which coincides with the axis of rotation (not shown), one slot 114 of which may be seen in the detail, and is provided with a stator yoke 122 on the opposite side. Slot 114 has a first slot width bn1 at slot base 120 and a second slot width bn2 in the area of tooth head 118. Two slots 114 are separated from one another by tooth 116, extending from slot base 120 to tooth head 118.

Teeth 116 have a first tooth width bz1 at the slot base and second tooth width bz2 at tooth head 118 and are spaced a distance apart by a slot width sn at tooth width 118. "Tooth width bz1 at the slot base" is the distance at which the imaginary continuation of the flanks of the teeth would intersect with the imaginary continuation of the slot base. Such a method of ascertaining tooth width bz1 is indicated, for example, when the transition between the side and the slot base is rounded out. Stator 16 may be designed for an external rotor or an internal rotor. In the case of an external rotor, slots 114 protrude radially outward and yoke 122 protrudes inward; for an internal rotor, slots 114 protrude radially inward and the yoke protrudes outward. Teeth 116 have a comparable width in the area of tooth head 118 and in the area of slot base 120, i.e., tooth head 118 is not designed in a pronounced manner and therefore essentially does not protrude beyond the slot. Slot width sn is essentially equal to slot width bn2 at tooth head 118. The diagram in FIG. 1b is only exemplary in this regard.

Slots 114 are provided with a plurality of coils connected in series electrically to accommodate at least one coil winding, which is manufactured from at least one continuous wire 124 without interruption.

Ratio bz2/hj of tooth width bz2 at tooth head 118 to yoke height hj, the yoke height being the radial distance between slot base 120 in core body 17 and the opposite outside diameter of core body 17, is between 0.3 and 0.8 according to the present invention, preferably between 0.4 and 0.6, in particular preferably between 0.4 and 0.5. For the case when there is also an exterior tooth at the location where the outside diameter is situated, its radial extent is not taken into account beyond a continuous arc-shaped yoke part. Ratio bz2/bn2 of tooth width bz2 at tooth head 118 to slot width bn2 at tooth head 118 is thus between 0.3 and 3 according to the present invention, preferably between 0.5 and 2.5, in particular preferably between 0.7 and 1.6.

On installation of stator 16 into a generator housing (not shown) of the polyphase electric machine, it is expedient to mount stator 16 between bearing shields 13.1, 13.2 of the type conventionally found in a generator, in such a way that the mounting faces are embodied as the attachment faces for bearing shields 13.1, 13.2 in a ring shape on the end faces of stator 16, so they are both parallel to one another and at a certain installation distance from one another and extend radially over the part of stator yoke 122 that is required magnetically because the winding protrudes radially to the outside only slightly beyond slot base 120. In addition, it is favorable to additionally provide slots that are not depicted in greater detail here in three to four locations on the outside circumference of stator 16, allowing housing screws to be installed in an even smaller radius around the generator, e.g., at the slot base of these slots provided on the outside circumference of stator 16.

Figure 2:
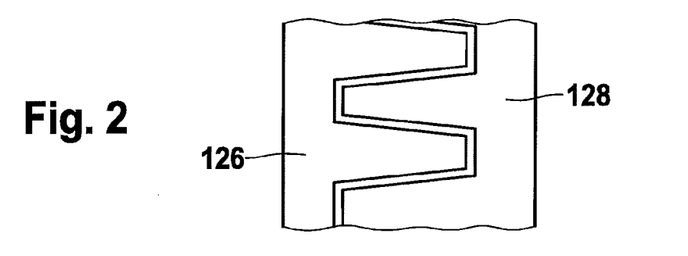
FIG. 2 shows a preferred method step in the production of toothed strips for manufacturing a stator.

FIG. 2 shows a top view of two toothed parallel strips 126, 128, where the strips having slots and teeth are situated so that the strips are parallel to one another and mesh with one another to thereby allow them to be cut in pairs without waste from sheet metal (see also WO 01/54254).

Figure 6:
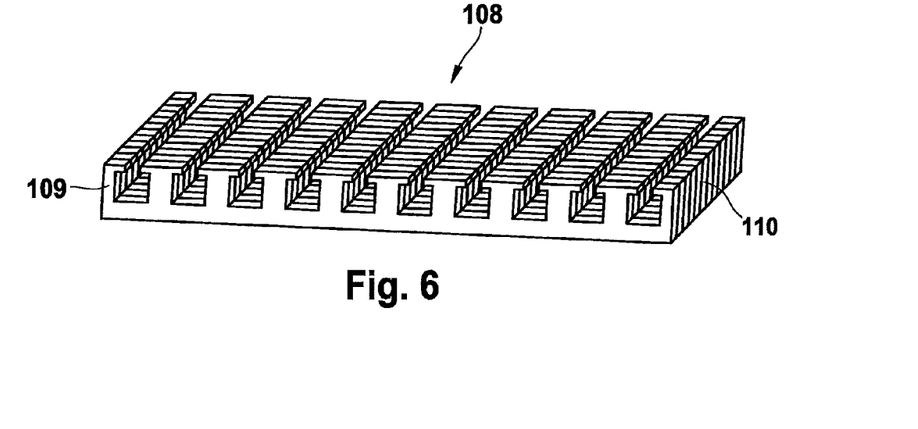
FIG. 6 shows a flat cuboid laminated core (in principle)
Figure 7:
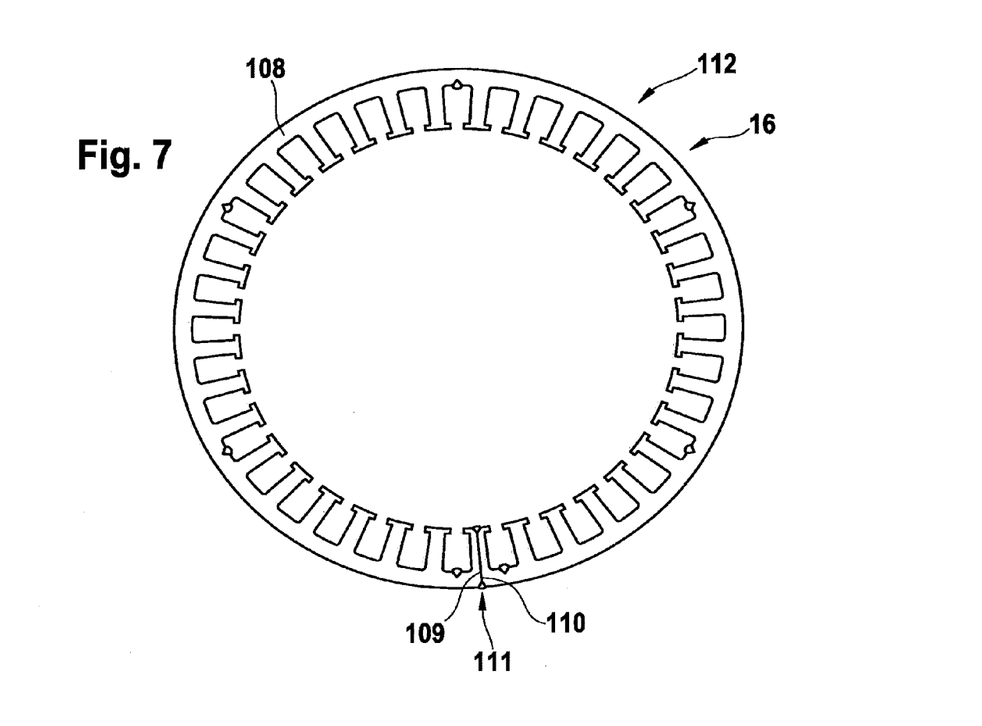
FIG. 7 shows a cylindrical laminated core of a formerly flat laminated core that has been bent into a round shape (in principle).

To manufacture stator 16, core body 17 is formed from a laminated core which is shaped from toothed parallel strips 126, 128. This is made possible by the fact that tooth head 118 is not stamped, i.e., does not protrude with respect to the tooth in the circumferential direction. Strips 126, 128 may be cut to a predetermined length, stacked one above the other as strip lamellae to form a flat laminated core 108 and rolled about an axis parallel to the direction of stacking of the laminated core by bending deformation to form a round laminated core 112 and thereby create core body 17. Wires 124 of the winding may next be introduced.

Alternatively, the winding may be inserted together with wires 124 into a flat laminated core 108 and then bent to form stator 16. In a laminated core, slot 114 is opened wider in the flat state than in the round state. The winding may be mounted in the laminated core more easily.

FIG. 6 shows an example of a core body 17 formed as a flat laminated core 108 having two core ends 109, 110. By bending laminated core 108 into a round shape and then joining the two adjacent core ends 109, 110, round laminated core 112 shown in FIG. 6 is obtained with an impact point 111. In one of the methods according to the present invention, winding system 18 is introduced into flat laminated core 108 before bending, although this is not shown in FIG. 7.

Wires 124 may be secured in slots 114 by impregnating their winding head. This is favorable with teeth 116 having tooth heads 118, which are not pronounced, i.e., essentially do not protrude in the circumferential direction with respect to the teeth because for installation of the winding in slots 114, the width of the slot must be greater than the width of the wire. For this purpose, it is advantageous if the impregnation of a wire 124 in the winding head has at least one point of contact through impregnation with all other phases reinforced by impregnation.

Figure 3A:
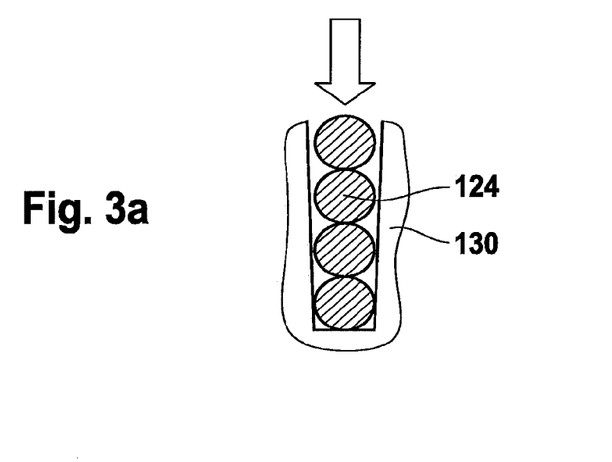
FIG. 3a shows a preferred method step in stamping wires before inserting them into a stator before stamping and FIG. 3b shows the same after stamping.
Figure 3B:
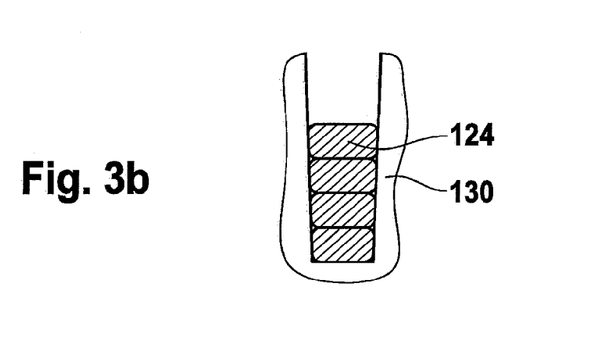

It is advantageous to manufacture the winding of round wires 124 and then to stamp it onto the slot shape of round stator 16. All wires filling a slot 114 may be stamped jointly for this purpose. It is also conceivable to stamp each wire individually. FIG. 3a shows round wires 124 in a mold 130 having the slot shape of round stator 16 before stamping wire 124. An arrow shows the force acting on wires 124 in stamping. FIG. 3b shows wires 124 after stamping in mold 130. Slightly trapezoidal mold 130 facilitates unmolding of wires 124. Stamping allows a higher filling factor of the winding and/or wires 124 in slot 114 at a low cost. It is particularly favorable if the width of the mold for stamping the winding and/or the internal end contour of mold 130 is between 1× and 1.49× the original wire diameter. Wire crossings may then be largely avoided. Stamping of individual wires 124 as well as all wires 124 together is thus possible.

Figure 4:
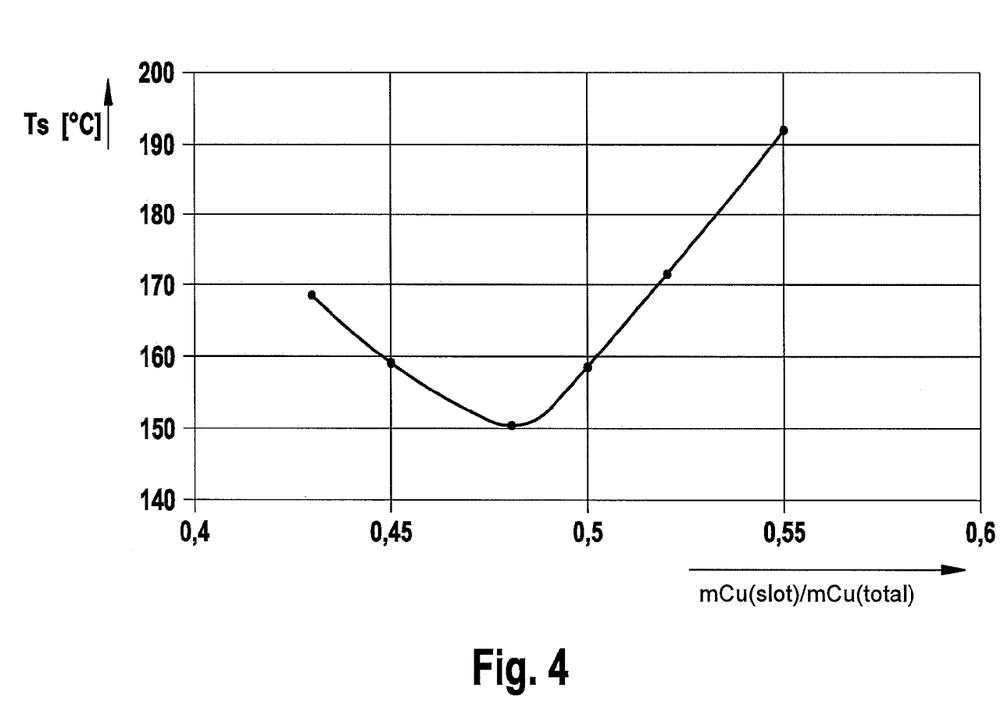
FIG. 4 shows a temperature characteristic of the stator plotted against a mass ratio of the conductor material in the slots and in the stator on the whole.

FIG. 4 shows a curve of temperature Ts of stator 16 as a function of the mCu(slot)/mCu(total) ratio of copper mass mCu(slot) (or metal mass) of wire 124 in slot 114 to total copper mass mCu(total) (or total metal mass) of wire 124. Wire 124 is preferably made of copper. The mCu(slot)/mCu (total) ratio according to the present invention is between 0.43 and 0.55, preferably between 0.45 and 0.53, in particular preferably between 0.47 and 0.51. At lower mass ratios, temperature Ts is high, e.g., 170° C., and drops to a minimum of 150° C., for example, whereas it then rises at higher mass ratios.

What is claimed is:

1. A stator for a polyphase electric machine, comprising:
a core body which, in a radial direction with respect to an axis of rotation of the electric machine, has slots with a slot width on one side of the core body parallel to a longitudinal axis of the core body and is provided on the opposite side with a stator yoke, two slots being respectively separated from one another by a tooth having a tooth width and extending from a slot base to a tooth head, the slots being provided with a plurality of coils connected electrically in series to receive at least one coil winding, the coil winding being manufactured from at least one continuous wire without interruption;
wherein at least one of (a) a ratio of the tooth width at the tooth head to the yoke height is between 0.3 and 0.8, (b) a ratio of the tooth width at the tooth head to the slot width at the tooth head is between 0.3 and 3, and (c) a ratio of a copper mass of the wire in the slot to a total copper mass of the wire is between 0.43 and 0.55.

2. The stator according to claim 1, wherein the ratio of tooth width at the tooth head to the yoke height is between 0.4 and 0.6.

3. The stator according to claim 1, wherein the ratio of the tooth width at the tooth head to the yoke height is between 0.4 and 0.5.

4. The stator according to claim 1, wherein the ratio of the tooth width at the tooth head to the slot width at the tooth head is between 0.5 and 2.5.

5. The stator according to claim 1, wherein the ratio of the tooth width at the tooth head to the slot width at the tooth head is between 0.7 and 1.6.

6. The stator according to claim 1, wherein the ratio of the copper mass of the wire in the slots to the total copper mass of the wire in the stator is between 0.45 and 0.53.

7. The stator according to claim 1, wherein the ratio of the copper mass of the wire in the slots to the total copper mass of the wire in the stator is between 0.47 and 0.51.

8. The stator according to claim 1, wherein the slot includes parallel flanks.

9. The stator according to claim 1, wherein the teeth have a comparable, approximately a same, width, in an area of the tooth head and in an area of the slot base.

10. The stator according to claim 1, wherein the wires have a winding head that protrudes axially beyond the slots and the winding head is impregnated, the impregnation of a wire of one phase in the winding head having at least one point of contact with all other phases through the impregnation, the point of contact being reinforced by impregnation.

11. The stator according to claim 1, wherein the slot width is substantially equal to the slot width at the tooth head.

12. The stator according to claim 1, wherein the slot width is greater than the width of the wire.

13. The stator according to claim 1, wherein the electric machine is a claw pole generator, the rotor being made up of two claw pole boards which are spaced an axial distance apart by a pole core.

14. The stator according to claim 13, wherein the winding heads are situated substantially in a radial cooling air stream of fans.

15. The stator according to claim 14, wherein the cooling air stream is created substantially by two fans which are connected axially to two end faces of the rotor and each has a common contact surface with the claw pole boards.

16. The stator according to claim 14, wherein a cooling air stream flows through an air gap separating the stator and rotor and thereby cools the wires situated in the slots.

17. A method for manufacturing a stator for a polyphase electric machine having a core body which, in a radial direction with respect to an axis of rotation of the electric machine, has slots with a slot width on one side of the core body parallel to a longitudinal axis of the core body and is provided on the opposite side with a stator yoke, two slots being respectively separated from one another by a tooth having a tooth width and extending from a slot base to a tooth head, the slots being provided with a plurality of coils connected electrically in series to receive at least one coil winding, the coil winding being manufactured from at least one continuous wire without interruption, at least one of (a) a ratio of the tooth width at the tooth head to the yoke height is between 0.3 and 0.8, (b) a ratio of the tooth width at the tooth head to the slot width at the tooth head is between 0.3 and 3, and (c) a ratio of a copper mass of the wire in the slot to a total copper mass of the wire is between 0.43 and 0.55, comprising:

joining the wires in the slots substantially in the radial direction.

18. The method according to claim 17, wherein the wires are secured in the slots by impregnation of their winding head.

19. The method according to claim 17, wherein the wires are round wires, are stamped in a mold, and are then introduced into the slots of the stator.

* * * * *